United States Patent [19]

Yamanis et al.

[11] Patent Number: 5,032,555
[45] Date of Patent: * Jul. 16, 1991

[54] PROCESS FOR MAKING ZIRCONIA-ALUMINA

[75] Inventors: Jean Yamanis, Morristown; Anthony J. Fanelli, Rockaway; Stephen Haig, Madison; Beili Li, Morristown; Gary Marsh, Pittstown, all of N.J.

[73] Assignee: Allied-Signal Inc., Morris Township, N.J.

[*] Notice: The portion of the term of this patent subsequent to Jul. 4, 2006 has been disclaimed.

[21] Appl. No.: 194,357

[22] Filed: May 16, 1988

[51] Int. Cl.$^5$ .................... C04B 35/10; C04B 35/48
[52] U.S. Cl. ................... 501/105; 501/103; 423/600; 423/608; 264/13
[58] Field of Search .............. 501/103, 105; 423/600, 423/608; 264/13

[56] References Cited

U.S. PATENT DOCUMENTS

| | | | |
|---|---|---|---|
| 4,429,051 | 1/1984 | Davidgeet et al. | 501/105 X |
| 4,501,818 | 2/1985 | Rossi | 501/103 X |
| 4,532,224 | 7/1985 | Hori | 501/105 |
| 4,574,003 | 3/1986 | Gerk | 501/105 X |
| 4,626,518 | 12/1986 | Watanabe et al. | 501/105 X |
| 4,649,037 | 3/1987 | Marsh et al. | 423/338 |
| 4,665,040 | 5/1987 | Kurita et al. | 501/105 |
| 4,845,056 | 7/1989 | Yamanis | 501/103 X |

FOREIGN PATENT DOCUMENTS 0199930 11/1986 European Pat. Off. ............. 264/13

OTHER PUBLICATIONS

Condensed Chemical Dictionary, Hawley, (1974) p. 412.
Murase et al., "Stability of $ZrO_2$ Phases in Ultrafine $ZrO_2$-$Al_2O_3$ Mixtures", J. of Am. Cer. Soc. vol. 69 No. 2 (1986).

Primary Examiner—Mark L. Bell
Assistant Examiner—Karl Group
Attorney, Agent, or Firm—Ernest D. Buff; Gerhard H. Fuchs; Richard C. Stewart

[57] ABSTRACT

Zirconia toughened alumina (ZTA) is produced from precursor salts. The precursor salts are coprecipitated from solution to yield a gel in a liquid phase. The gel in excess of the critical temperature and pressure is dried at a temperature and pressure in excess of the critical temperature and pressure of the liquid phase to thereby convert the liquid phase to a gas. The solid particles, when separated from the gas, form a fine particulate ZTA which, upon consolidation yields near theoretical density toughened ceramics.

14 Claims, 1 Drawing Sheet

Continuous Aerogel Process

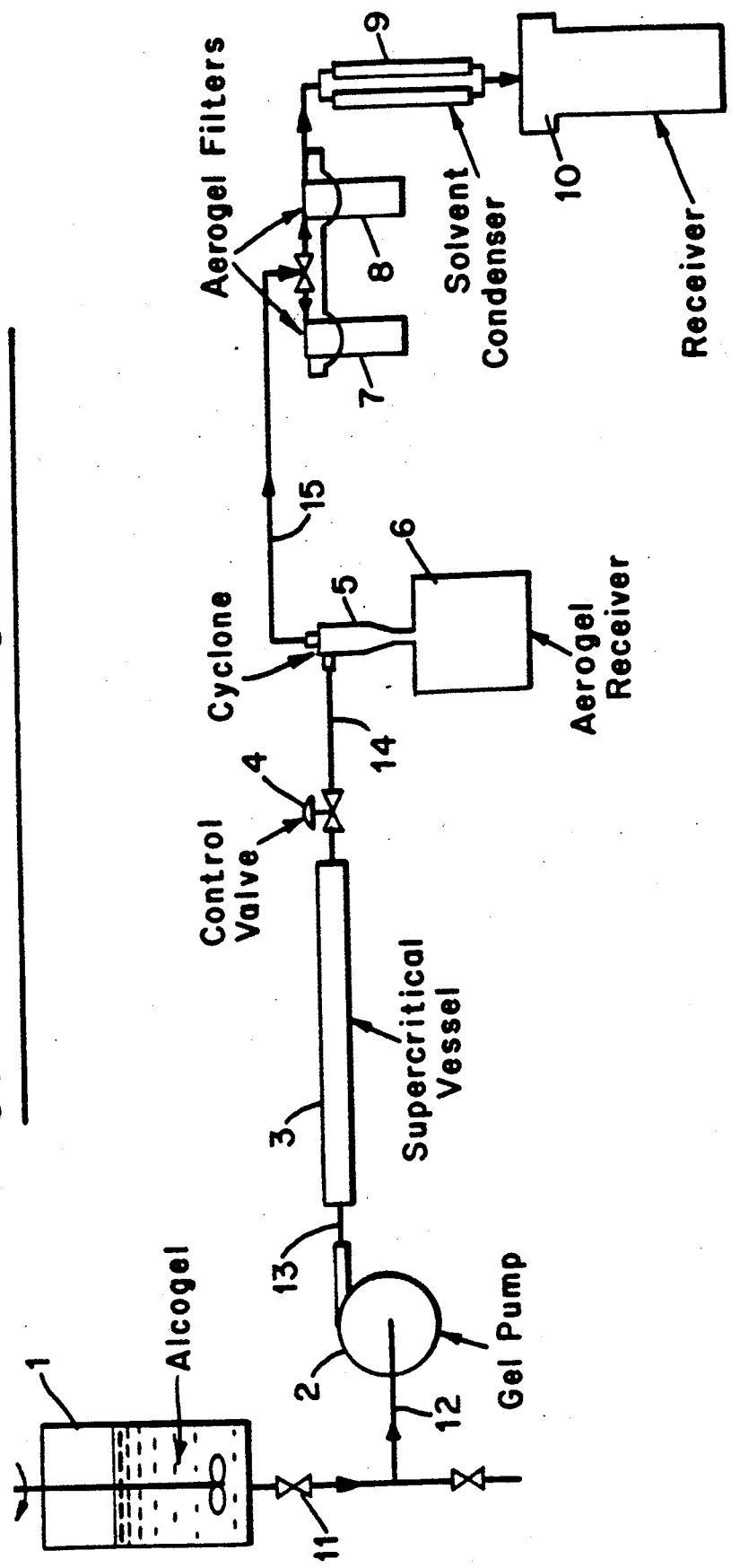

PROCESS FOR MAKING ZIRCONIA-ALUMINA

BACKGROUND OF THE INVENTION

The present invention relates to a process for making a zirconia toughened alumina having an extremely small particle size, high density, high flexural strength and fracture toughness in a low-cost, simple manner.

Zirconia toughened alumina (ZTA) is a high strength ceramic used in a variety of extreme environmental conditions. The ceramic of zirconia in a continuous matrix of alumina has generally been found to have superior fracture toughness, but at the expense of mechanical strength. The ability to obtain high toughness while maintaining suitable strength has been a major concern of the art.

It has been proposed that both said fracture toughness and flexural strength can be attained by providing the continuous ceramic matrix with extremely fine microfissures in U.S. Pat. No. 4,298,385. In that patent, ceramic powders are obtained by wet milling the ceramic oxide to the appropriate particle size. The zirconia is of a 2 to 15 micron average agglomerate size, whereas the alumina is ground to the submicron range. The microfissures in the matrix are created by the interdispersed zirconia particles undergoing a phase transition (and concomitant volume expansion) from the metastable tetragonal crystalline form to a stable form upon cooling from sintering to room temperature. However, this increase in fracture toughness from the microfissures causes a decrease in flexural strength. This process also relies on time and energy-intensive grinding to obtain the desired particle sizes.

The use of interdispersed, fine (submicron range) grain zirconia in an alumina matrix has also been proposed in various other patents. U.S. Pat. No. 4,218,253 discloses the use of metastable tetragonal zirconia particles in the submicron size range interdispersed in an alumina matrix. It is alleged that these small particles give a ceramic body with both high strength and fracture toughness without the need for microfissures. U.S. Pat. No. 4,316,964 is similar to U.S. Pat. No. 4,218,253 and discloses the addition of various stabilizing agents such as yttria so that larger sized grains of zirconia can be used in an alumina matrix without transformation into the stable monoclinic form. The object in both of these patents is to have zirconia in the metastable tetragonal form at room temperature on the theory that when a crack forms, the metastable tetragonal $ZrO_2$ transforms into the stable monoclinic structure at the crack front thereby increasing the overall fracture toughness.

U.S Pat. No. 4,314,827 discloses the use of a zirconia gel which was dried and coarsely ground approximately to 150 microns) in a ceramic (e.g. alumina and magnesia) matrix with an acceptable density for use as an abrasive. The zirconia gel was formed from zirconyl alkanate and peptized alumina monohydrate.

Production of high density ceramic grade ZTA particulate powders is disclosed in U.S. Pat. No. 4,532,224. The process of the patent involves a flash evaporation in a specifically designed high temperature flash furnace to obtain extremely fine zirconia particles which are naturally stable in the tetragonal form (less than 0.2 μm). The extremely fine grained particles are centrifuged and dried to remove the water used in the rapid quench after the flash evaporation. There is no discussion of the agglomerate size, however. The process is complex, requires fine scale turbulent atomization, and the product cannot be handled easily.

The use of coprecipitation as a method of preparing zirconia ceramics was proposed by Japanese Patent No. 54-25523. A precursor zirconia salt of a nitrate or an oxychloride with additive amounts of stabilizer salts or oxides is co-precipitated with aqueous ammonia. The thus precipitated powders are made anhydrous by azeotropic distillation using added amounts of an organic solvent. Residual organic solvent is removed by drying at atmospheric pressure at 150° C.

U.S. Pat. No. 4,501,818 discloses coprecipitating zirconia and yttria in anhydrous ethanol with sodium hydroxide. The precipitate is dried, washed with water, and dried again. The object was to avoid filtering problems and yield a sinterable powder. However, the repetitive drying and need for anhydrous ethanol makes the process unacceptable for most industrial applications.

Despite the above efforts, a simple straightforward method of obtaining sinterable ZTA powders which have homogeneously dispersed fine particulates, a high density, high flexural strength and fracture toughness is still sought by the art.

OBJECTS AND SUMMARY OF THE INVENTION

Accordingly, it is a general object of the invention to alleviate the noted problems in the art.

It is a more specific object of the present invention to provide a process for producing a uniformly dispersed powder for the production of zirconia toughened alumina.

It is another object of the invention to provide a process by which fine dispersed ZTA powders are produced simply and directly from precursor solutions without the need for mixing or other complicated blending processing steps.

It is another object to provide a ZTA powder with high flexural strength and fracture toughness.

In accordance with the present invention, there is provided a process for producing zirconia toughened alumina comprising mixing an admixture of a major amount of an aluminum salt and a minor amount of a zirconium salt with a precipitating base to coprecipitate the hydrous oxides of zirconia and alumina, forming a gel in which the coprecipitate is suspended, as solid particles, within a liquid phase, heating and pressurizing the gel above the critical temperature and pressure of the gel liquid phase to thereby convert the liquid phase to a gas in a continuous flow or batch system, separating the solid particles from the liquid phase, and consolidating the solid particles.

Also, there is provided the product of the above process.

BRIEF DESCRIPTION OF THE DRAWING

The drawing represents a schematic depiction of the drying process employed in accordance with a preferred embodiment of the invention.

DETAILED DESCRIPTION OF PREFERRED EMBODIMENTS OF THE INVENTION

The process of the present invention produces a zirconia toughened alumina in which zirconia can be present in amounts of about 5 up to about 40, preferably 10 to 30, most preferably 15 to 25, volume percent and alumina in amounts of from 60 to about 95, preferably about 70 to about 90, most preferably about 75 to about 85, volume percent. In addition, yttria can be present in an amount expressed as a weight percentage based on $ZrO_2$ as from about 1 to about 12, and preferably about 2 to about 5, percent by weight of zirconia.

Stabilizers for zirconia other than yttria can be used in the process. Examples known in the art include CaO, MgO, and rare earth oxides such as $CeO_2$. In addition, hafnia or hafnia/zirconia mixtures can be used as the dispersed phase in alumina in place of zirconia. The above citations are meant to be only examples.

The alumina can also contain minor amounts of magnesium oxide. Such amounts are often naturally present in commercially available precursor salts of alumina. However, additional amounts can be used and it is generally contemplated that up to 0.2% by weight for grain growth inhibiting effects can be employed. Magnesium oxide can be added as a precursor salt and coprecipitated or added as an oxide or hydroxide directly into the precipitation solution or gel. The magnesium oxide could also be coprecipitated from, for example, magnesium nitrate, chloride, or acetate.

The ceramic powder composition can be formed from low cost aluminum, and zirconium (and optionally yttrium and magnesium) salts. Generally, the preferred, most widely available salts are the halide salts, particularly chloride salts, such as aluminum chloride, zirconium oxychloride and yttrium chloride. However, other salts such as nitrates which react to form the oxide under conditions of the present process are also usable.

Any base which will react with the salts and form a co-precipitated oxide mixture can be used. The preferred base is ammonia, particularly when the precipitation solution is water. The use of other solvent/base systems as would be known in the art are within the skill of the artisan. For example, amines, substituted amines, carbamides and ammonium compounds could be used as bases.

Inorganic bases such as NaOH could be used but residual sodium ion is known to be a contaminant that degrades the properties of ceramic materials.

The coprecipitate is formed upon the addition of the solution of the precursor ceramic oxide salts to the base solution as the preferred method. In this preferred method of coprecipitation, an aqueous solution of the precursor salts of aluminum and zirconium (and, optionally, yttrium and magnesium) is added to the solution of ammonia under turbulent mixing conditions. The amount of ammonia used is generally a stoichiometric excess of the amount needed to precipitate all of the salts present, preferably from 0 to 2, most preferably 0 to 0.5, molar excess.

After the coprecipitation, the coprecipitate is separated from the reaction solutions and is then washed. The washing is preferably performed with deionized water. However, any solvent, or solution with a solute therein, compatible with the end ceramic or which will sublime in the drying stage and which does not otherwise adversely affect the present process can be employed. Any volatile solvent which will dissolve the byproduct (e.g. $NH_4Cl$) of the precipitation reaction would be suitable as a wash solvent.

The washed precipitate is then diluted with an appropriate liquid to form a gel. The gel liquid solvent can be an aqueous or organic solvent. Whether using either an aqueous or organic solvent, it is generally preferable that the diluent be miscible with the wash solvent and/or the precipitating solvent. Where the precipitating and wash solvents are both aqueous, the diluent solvent similarly can be aqueous or an organic solvent which is miscible with water. Water miscible organic solvents, for example, include alcohols, such as methanol, ethanol, propanol and isopropanol, and ketones. The use of other suitable miscible pairs can be obtained from standard reference texts such as the "Handbook of Chemistry and Physics", (C.R.C. Press, 1974), pp C-720-722. Isopropanol is a preferred diluent when an aqueous or alcohol precipitating and/or washing solution is employed.

The choice of a suitable diluent is dependent upon the drying step which follows, as the choice of temperature and pressure in that step is above the critical temperature and pressure of the diluent and any residual wash and/or coprecipitation solvent.

The drying process can be performed immediately following the gel formation or the gel can be stored until the ZTA powder is needed.

The gel is then "dried" to form the desired powder, a mixture of zirconia and alumina. The "drying" practiced in this invention is a high temperature and pressure solid-liquid separation process. It is accomplished by a continuous or batch process involving heating and pressurizing the gel to a temperature and pressure above the critical temperature and pressure of the gel. The surface tension of the solvent phase of the gel at this temperature and pressure has a value of at or close to zero. The separation of the solvent from the powder occurs without substantial agglomeration of the solid particles. The powders formed are of a fine microparticle size range, generally from about 0.01 to about 10, often from about 0.1 to about 2 microns, which size particles are uniquely adapted for use in the preparation of modern, high-strength ceramics. The ceramics formed by the above process have high flexural strength and fracture toughness while being able to obtain a density close to the theoretical density.

The temperature of the separation step is generally dependent on the critical point of the solvent. Generally, drying is carried out at a temperature of from about 10 to about 100, preferably about 20 to about 80, most preferably about 20° to about 50° C., above the critical temperature of the solvents. The pressure is generally from about 5 to about 25, preferably from about 5 to 10, atmospheres above the critical pressure.

The solid-liquid separation can be performed continuously using the apparatus schematically shown in FIG. 1. The gel is stored in tank 1 which is in fluid communication with pump 2 via line 12. Pump 2 can be a high pressure diaphragm type displacement pump (gel pump) which raises the pressure of the gel to a level above the critical pressure of the gel solvent phase. The pressurized gel is then led via line 12 into the super critical vessel 3 which is a longitudinal vessel immersed in one or more constant temperature baths.

The temperature of the baths is maintained at a temperature ranging from about 50° C. to about 120° C., preferably from about 70° C. to about 100° C. above the critical temperature of the gel liquid. As the gel is heated within the baths, its temperature is raised to a temperature above the critical temperature isotherm of the gel carrier liquid. At this point, the surface tension of the gel liquid approaches zero simultaneously with the transition of the solvent phase from the liquid into the vapor phase. As the liquid enters the vapor phase, the solid, coprecipitated particles are entrained as a fine particulate powder in the gel liquid vapor.

The gas (vapor)/solid two-phase system is passed to one or more control valves 4 where the system is preferably adiabatically expanded. The use of a conventional type control valve is possible without the plugging problems which would be expected in conventional continuous drying techniques. An exemplary conventional control valve would be a sliding stem control valve with suitable stem and seat design modifications.

The adiabatically expanded solid entrained in the vapor is sent to one or more conventional cyclone 5 separators for separation of submicron and micron range particles from the vapor. The cyclone can be externally heated to avoid any incidental heat loss which may cause a recondensation of the vapor phase. This can be accomplished by any conventional method such as jacketing the cyclone and supplying the annular space defined by the jacket with a heated recirculating fluid or heated waste gases. Alternatively, the cyclone can be heated with an external coil heater or plate heater. The cyclone can also be insulated, which would prevent heat loss as well as reduce the noise level in the industrial setting.

The cyclone discharges the solids from its apex into a receiver 6. The vapor with possibly a carryover of ceramic powders exits line 15 via the cyclone overflow outlet. The exit line 15 can be jacketed to bring the temperature to an appropriate level for subsequent final removal of residue powders via filter 7 and 8. The temperature of the vapor is below the maximum allowable temperature (140° C.) for the filters. The system is shut down periodically and the filters are replaced.

The filtered vapors from the filters 7 and 8 are preferably condensed in a solvent condenser. The solvent is then available for recycle or other appropriate use or disposal.

The particles recovered from the drying process can be consolidated in ZTA bodies in any conventional manner, e.g., slip casting. The resulting ZTA bodies have high flexural strength and fracture toughness. In addition, the fine particles formed by the present process yield higher density bodies than obtained using other conventional, larger-sized, particles using the same forming process and conditions. Also, the products are characterized by an absence of microfissures.

For purposes of further illustration, the process of the invention and the product obtained thereby are illustrated in the following specific examples. These examples are considered to be illustrative only and are not intended to limit the scope and content of the invention or obvious variations thereover.

EXAMPLE 1

The following solutions were made:

Solution A: 38 g of $YCl_3$ solution containing the equivalent of 5.8 g of $Y_2O_3$ was added, under stirring, to 800 g of $ZrOCl_2$ solution containing the equivalent of 160 g of $ZrO_2$. To the resultant solution 4,063.5 g of $AlCl_3$ solution containing the equivalent of 434.8 g of $Al_2O_3$ was added, under stirring, to obtain solution A.

Solution B: 5.4 liters of concentrated $NH_4OH$ was added to 1.0 liter of deionized (DI) water.

Solution C: 4 liters of DI water being stirred by a Cowles mixer at 1000 rev/min.

Solutions A and B were added to the turbulent region of solution C at such rates as to maintain the pH of the resultant slurry greater than 9.6. At this pH the viscosity of the slurry is low and permits vigorous mixing by the mixer. The addition of the two solutions to solution C took approximately 75 min. The resultant white gel was stirred for an additional 30 min to assure complete mixing of the gel. This gel was subsequently washed with DI water several times and diluted with isopropanol so that the final liquid was about 20 w % water in isopropanol. This resultant slurry is denoted as slurry D.

A portion of slurry D was run through the continuous process shown in FIG. 1. The total pressure in the system was maintained at about 102 atm and the temperature at the inlet to the control valve at 330° C. A total of 980 g of powder (AG9938) was obtained. Some properties of the powder are given in Tables 1 and 2.

TABLE 1

Effects of Calcination Temperature (3 H Hold) on Surface Area and Crystallinity

| Temperature (C.) | Surface Area(m²/g) | Alumina Phases | Zirconia Phases |
|---|---|---|---|
| None | 249 | Bayerite, Boehmite | Amorphous |
| 800 | 158 | Gamma | Tetragonal |
| 950 | 90 | Theta, Sigma | Tetragonal |
| 1100 | 39 | Alpha, Theta | Tetragonal |
| 1250 | 8 | Alpha, tr. Theta | Tetragonal tr. Monoclinic |

TABLE 2

Effect of Calcination and Ball Milling on Particle Size Distribution

| Temperature (C.) | Ball-Mill Time (H) | Cumulative Size Distribution (um) | | |
|---|---|---|---|---|
| | | 33% | 50% | 67% |
| 1210 | 3 | 0.42 | 0.60 | 0.84 |
| 1210 | 24 | 0.33 | 0.50 | 0.72 |
| 1250 | 3 | 0.74 | 0.90 | 1.10 |

EXAMPLE 2

The following solutions were made:

Solution A: 46.3 g of $YCl_3$ solution containing the equivalent of 5.8 g of $Y_3O_3$ was added, under stirring, to 800 g of $ZrOCl_2$ solution containing the equivalent of 160 g of $ZrO_2$. To the resultant solution 4,101.2 g of $AlCl_3$ solution containing the equivalent of 434.8 g of $Al_2O_3$ was added, under stirring, to obtain solution A.

Solution B: 5.0 liters of concentrated $NH_4OH$.

Solutions A and B were added to the turbulent region of solution C, similar to that in Example I, at such rates as to maintain the pH of the resultant slurry greater than 9.6. At this pH the viscosity of the slurry is low and permits vigorous mixing by the mixer. The addition of the two solutions to solution C took approximately 35 min to assure complete mixing of the gel. This gel was subsequently washed with DI water several times and diluted with isopropanol. This resultant slurry is denoted as slurry D.

A portion of slurry D was run through the continuous process shown in FIG. 1. The total pressure in the system was maintained at about 102 atm and the temperature at the inlet to the control valve at 320° C. A total of 825 g of powder (AG9962) was obtained. The as-produced powder had a surface area of 210 m²/g Powder calcined at 1200° C. for 6 hours had surface area of 12.2 m²/g and average particle size of 0.4 um after ball milling for 7 hours.

EXAMPLE 3

Powder from Example 2 was calcined at 1273° C. for 6 hours. A portion of this powder was used to prepare a slip for slip casting as follows: 120 g of powder was placed in a polyethylene jar with 60 g of DI water, 2 cc of ammonium hydroxide, 0.75 g of 0.5% Darvan C, and 1000 g of milling media. The charge was milled for 4 hours and after further addition of Darvan C to make it 1% dispersant based on the powder taken, ball milling was continued for a total of 24 hours. The resultant slurry had 70.8% solids and was used to make two blocks by slip casting. After drying the blocks were fired at specified temperatures for 1 hour. Table 3 gives densification and mechanical property data for the fired blocks.

TABLE 3

Mechanical Property Data for Coprecipitated Zirconia Toughened Alumina

| Sintering Temp. (C.) | Density % TD | Hardness Kg/mm$^2$ | MOR Strength ksi | Fracture Toughness MPa · m$^{\frac{1}{2}}$ |
|---|---|---|---|---|
| 1525 | 96.2 | 1476 | 107 | 4.2 |
| 1575 | 97.0 | 1520 | 110 | 4.5 |

Other embodiments of the invention will be apparent to those skilled in the art from a consideration of this specification or practice of the invention disclosed herein. It is intended that the specification and examples be considered as example only, with the true spirit of the invention being indicated by the following claims.

We claim:

1. A process for producing zirconia toughened alumina, comprising the steps of: mixing an admixture of a major amount of an aluminum salt and a minor amount of a zirconium salt with a precipitating base to coprecipitate the hydrous oxides of zirconia and alumina, forming a gel in a liquid phase, drying said gel by heating and pressurizing the gel above the critical temperature and pressure of the liquid phase to thereby convert the liquid phase to gas, separating the solid particles from the gas and consolidating the solid particles.

2. The process of claim 1 wherein the zirconium and aluminum salts are halide salts.

3. The process of claim 1 wherein the precipitating base is ammonia and is added to the admixed salt solution in a solution.

4. The process of claim 1 wherein the salt admixture additionally contains a yttrium salt.

5. The process of claim 4 wherein the gel is formed continuously and fed continuously to a first heating step followed by a second heating step to the aforesaid critical temperature and pressure.

6. The process of claim 5 wherein the liquid phase is an aqueous solvent.

7. The process of claim 1 wherein said consolidated particles contain from about 75 to about 85 volume percent alumina and from about 15 to about 25% by volume of zirconia.

8. The process of claim 1 wherein said consolidated particles contain about 70 to about 90 volume percent alumina and from about 10 to about 30 volume % zirconia.

9. The process of claim 1 wherein said consolidated particles contain about 5 to about 40 volume percent of the zirconia.

10. The process of claim 4 wherein the yttria salt is present in an amount of from about 1 to about 12 weight percent of the zirconia.

11. The process of claim 4 wherein the yttria salt is present in an amount of from about 2 to about 5 weight percent of the zirconia.

12. The process of claim 1 wherein the liquid phase is an aqueous liquid.

13. The process of claim 1 wherein the liquid phase is primarily a water miscible organic solvent.

14. The process of claim 1 wherein the liquid phase is primarily isopropane.

* * * * *